(12) United States Patent
Neumeier et al.

(10) Patent No.: US 10,286,503 B2
(45) Date of Patent: May 14, 2019

(54) FASTENER DELIVERY SYSTEM

(71) Applicant: Honda Motor Co., Ltd., Tokyo (JP)

(72) Inventors: Samuel J. Neumeier, Troy, OH (US);
George Alexander Hollis, Birmingham, AL (US); Samuel Thompson, Anniston, AL (US); Kaleb T. Allen, Phenix City, AL (US); John Michael Scelsi, Pell City, AL (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/631,175

(22) Filed: Jun. 23, 2017

(65) Prior Publication Data
US 2018/0369973 A1      Dec. 27, 2018

(51) Int. Cl.
*B23P 19/00*      (2006.01)
*B25B 23/04*      (2006.01)

(52) U.S. Cl.
CPC ........... *B23P 19/003* (2013.01); *B23P 19/002* (2013.01); *B23P 19/006* (2013.01); *B25B 23/045* (2013.01)

(58) Field of Classification Search
CPC ..... B23P 19/006; B23P 19/003; B23P 19/002; B25B 23/045
USPC ........................................................ 221/156
See application file for complete search history.

(56) References Cited

U.S. PATENT DOCUMENTS

| | | | |
|---|---|---|---|
| 3,581,967 A | 6/1971 | Benson | |
| 4,044,462 A * | 8/1977 | Anselmo | B21J 15/32 198/468.6 |
| 4,593,845 A * | 6/1986 | Andersson | B25B 23/06 227/112 |
| 4,694,974 A | 9/1987 | Heck et al. | |
| 4,819,326 A * | 4/1989 | Stannek | H05K 13/0404 29/741 |
| 5,248,058 A * | 9/1993 | Aoyama | B23P 19/006 221/165 |
| 5,542,524 A * | 8/1996 | Sakoda | B23P 19/003 198/409 |
| RE35,914 E * | 10/1998 | Aoyama | B23K 9/206 219/93 |
| 5,974,660 A | 11/1999 | Müller | |
| 6,006,975 A | 12/1999 | Ishizawa | |
| 6,832,431 B2 | 12/2004 | Bloch et al. | |
| 6,986,450 B2 | 1/2006 | Matthews et al. | |
| 6,990,897 B2 * | 1/2006 | Gaskin | B23P 19/006 100/214 |
| 7,367,484 B2 * | 5/2008 | Neal | B21J 15/32 227/109 |

(Continued)

*Primary Examiner* — Rakesh Kumar
(74) *Attorney, Agent, or Firm* — Rankin, Hill & Clark LLP (57) ABSTRACT

A fastener delivery system includes an escapement mechanism configured to control dispensing of associated fasteners located in a column one associated fastener at a time and a rotate and present apparatus operable with the escapement mechanism. The apparatus is configured to rotate between a fastener receiving position and a fastener loading position. In the fastener receiving position the apparatus is adapted to receive each associated fastener released from the escapement mechanism, and in the fastener loading position the apparatus is configured to present each associated fastener to an associated fastener installation device. The escapement mechanism is adjustable in a height direction relative to the apparatus.

17 Claims, 9 Drawing Sheets

(56) References Cited

U.S. PATENT DOCUMENTS

| | | | |
|---|---|---|---|
| 7,458,244 B2 | 12/2008 | Dehlke et al. | |
| 7,729,796 B2* | 6/2010 | Hartrampf | B21J 15/043 |
| | | | 29/243.53 |
| 8,347,766 B2* | 1/2013 | Ota | B23P 19/003 |
| | | | 81/430 |
| 8,636,186 B2* | 1/2014 | Shinjo | B23P 19/006 |
| | | | 227/118 |
| 9,278,798 B2* | 3/2016 | Neumeier | B65D 83/02 |
| 9,299,209 B2* | 3/2016 | Neumeier | G07F 11/02 |
| 9,421,649 B2* | 8/2016 | Chung | B23P 19/003 |
| 9,604,327 B2* | 3/2017 | Iwamoto | B23K 11/004 |
| 2009/0071973 A1* | 3/2009 | Hester | B23P 19/003 |
| | | | 221/190 |
| 2011/0297724 A1* | 12/2011 | Shinjo | B23P 19/006 |
| | | | 227/119 |
| 2013/0223956 A1 | 8/2013 | Gostylla | |
| 2017/0209966 A1* | 7/2017 | Skolaude | B23P 19/006 |

\* cited by examiner

FASTENER DELIVERY SYSTEM

BACKGROUND

Manufacturing equipment that automatically delivers fasteners (e.g., bolts) to a workpiece, or a fastening installation device (e.g., a robot), is typically employed in high rate production environments. The equipment generally comprises a storage device for the fasteners and a mechanism or system that transports fasteners from the storage device to the workpiece or fastening installation device. One example of a fastener delivery system includes a pneumatic power supply to transport the fasteners through a delivery tube to a fastener injection device. The fastener injection device manipulates the fastener into an orientation capable of being received by the fastener installation device and delivers the fastener to the fastener installation device.

BRIEF DESCRIPTION

According to one aspect, a fastener delivery system comprises an escapement mechanism configured to control dispensing of associated fasteners located in a column one associated fastener at a time and a rotate and present apparatus operable with the escapement mechanism. The apparatus is configured to rotate between a fastener receiving position and a fastener loading position. In the fastener receiving position the apparatus is adapted to receive each associated fastener released from the escapement mechanism, and in the fastener loading position the apparatus is configured to present each associated fastener to an associated fastener installation device. The escapement mechanism is adjustable in a height direction relative to the apparatus.

According to another aspect, a fastener delivery system comprises an escapement mechanism configured to control dispensing of associated fasteners located in a column one associated fastener at a time and a rotate and present apparatus operable with the escapement mechanism. The apparatus is rotatable between a fastener receiving position and a fastener loading position. The apparatus includes a fastener holder adapted to receive each associated fastener released from the escapement mechanism and position each associated fastener for an associated fastener installation device. A rotary actuator is connected to the fastener holder and adapted to rotate the fastener holder between the fastener receiving position and the fastener loading position. The rotary actuator is adapted to rotate the fastener holder in a first direction from the fastener receiving position to the fastener loading position. The rotary actuator is adapted to rotate the fastener holder in a second opposite direction from the fastener loading position to a fastener reject position. The apparatus includes a first stop member connected to the fastener holder and a second stop member spaced from the fastener holder. A first engagement of the first stop member with the second stop member defines a first hard stop for the fastener holder at the fastener receiving position, and a second engagement of the first stop member with the second stop member defines a second hard stop for the fastener holder at the fastener loading position.

DETAILED DESCRIPTION

Figure 1:
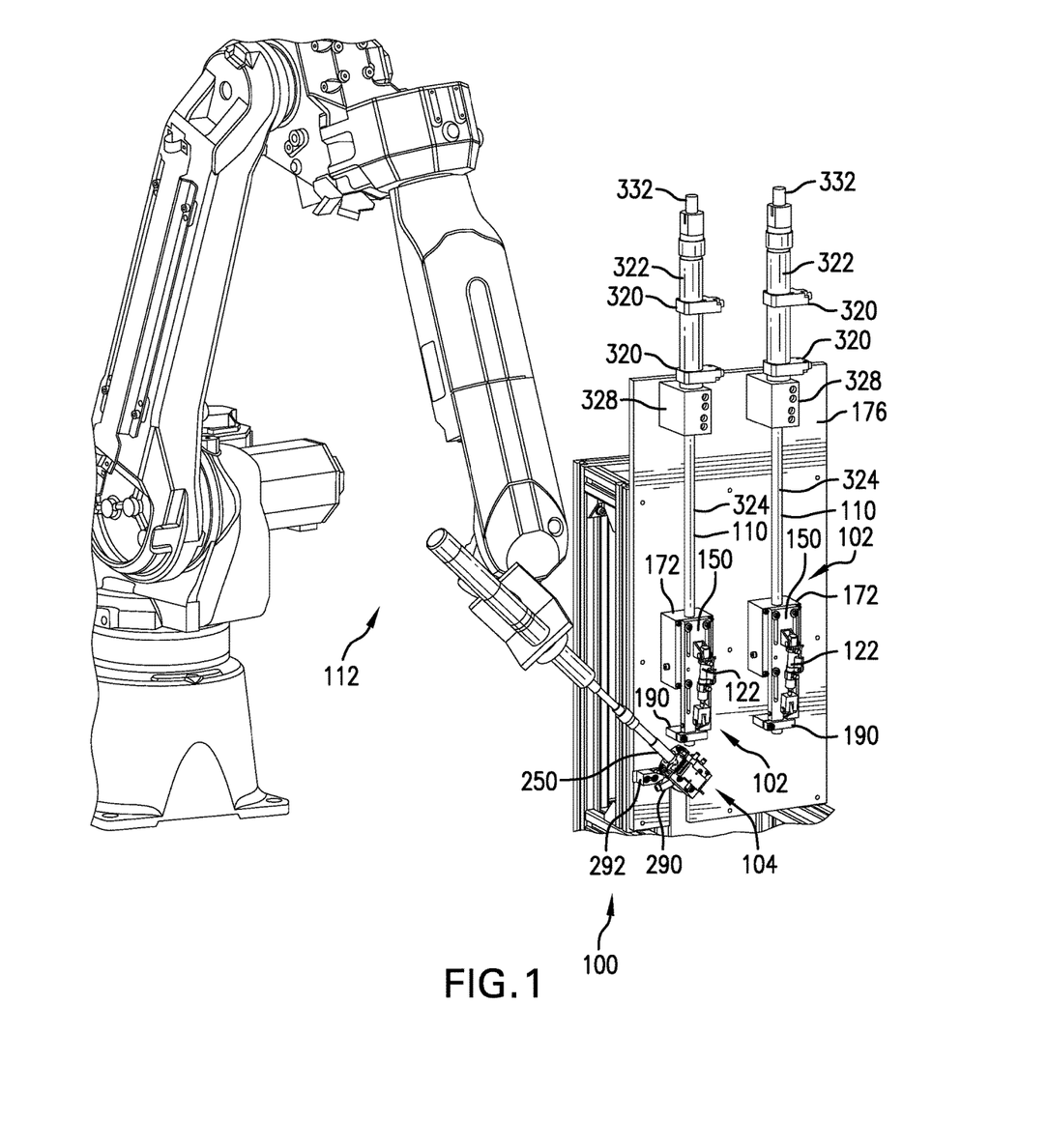
FIG. 1 is a partial perspective view of an exemplary fastener delivery system according to the present disclosure. The fastener delivery system comprises an escapement mechanism configured to control dispensing of fasteners located in a column one fastener at a time and a rotate and present apparatus operable with the escapement mechanism.

It should, of course, be understood that the description and drawings herein are merely illustrative and that various modifications and changes can be made in the structures disclosed without departing from the present disclosure. Referring to FIGS. 1-10, an exemplary fastener delivery system 100 according to the present disclosure generally comprises an escapement mechanism 102 and a rotate and present apparatus 104 operable with the escapement mechanism. The exemplary escapement mechanism 102 is configured to control dispensing of fasteners 106 (e.g., bolts) located in a column 110 one fastener at a time. The escapement mechanism 102 is configured to move between a first position and a second position. In the first position the escapement mechanism 102 is adapted to directly engage a forward most or downstream fastener (i.e., a first fastener 106') at a first location in the column 110 (FIG. 2), and in the second position the escapement mechanism 102 is adapted to release the first fastener and directly engage a fastener immediately upstream of the first fastener (i.e., a second fastener 106") at a second location in the column 110 (FIGS. 3 and 4). The escapement mechanism 102 is adapted to cycle the second fastener to the first location in the column 110 as the escapement mechanism 102 moves from the second position back to the first position. According to one aspect, the exemplary rotate and present apparatus 104 is configured to rotate in a first direction (e.g., a clockwise direction) from a fastener receiving position (FIG. 4, e.g., a 12 o'clock position), past a fastener reject position (e.g., about a 6 o'clock position), and to a fastener loading position (FIG. 1, e.g., about an 11 o'clock position). The exemplary rotate and present apparatus 104 is also configured to rotate in a second opposite direction (e.g., a counterclockwise direction) from the fastener loading position to the fastener reject position. In the fastener receiving position the apparatus 104 is adapted to receive each fastener released from the escapement mechanism 102, and in the fastener loading position the apparatus 104 is configured to present each properly seated fastener to a fastener installation device or robot 112. According to another aspect, the exemplary rotate and present apparatus 104 is configured to rotate in a first direction (e.g., a counterclockwise direction) from the fastener receiving position, past the fastener reject position, and to a fastener loading position (FIG. 6, e.g., about a 2 o'clock position), and rotate in a second opposite direction (e.g., a clockwise direction) from the fastener loading position to the fastener reject position.

Figure 2:
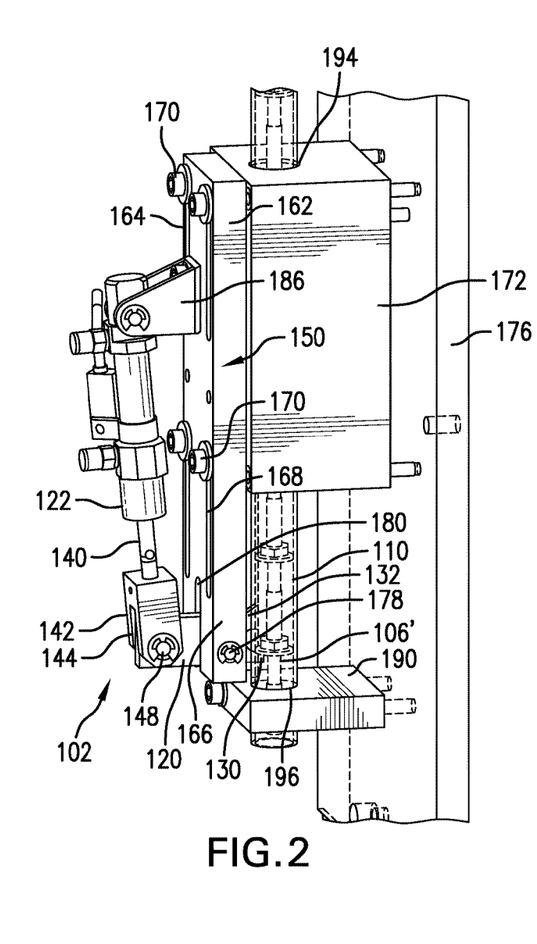
FIGS. 2 and 3 are perspective view of the escapement mechanism in respective first and second positions.
Figure 3:
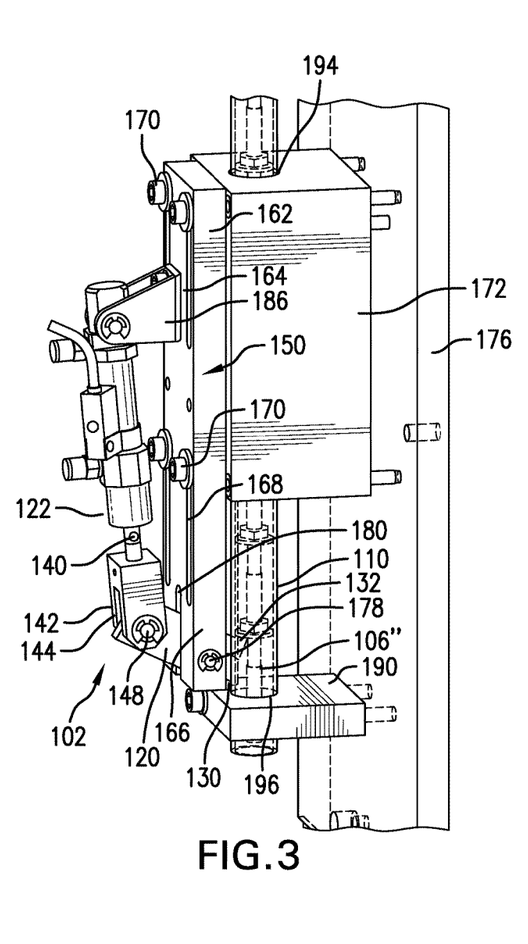
Figure 4:
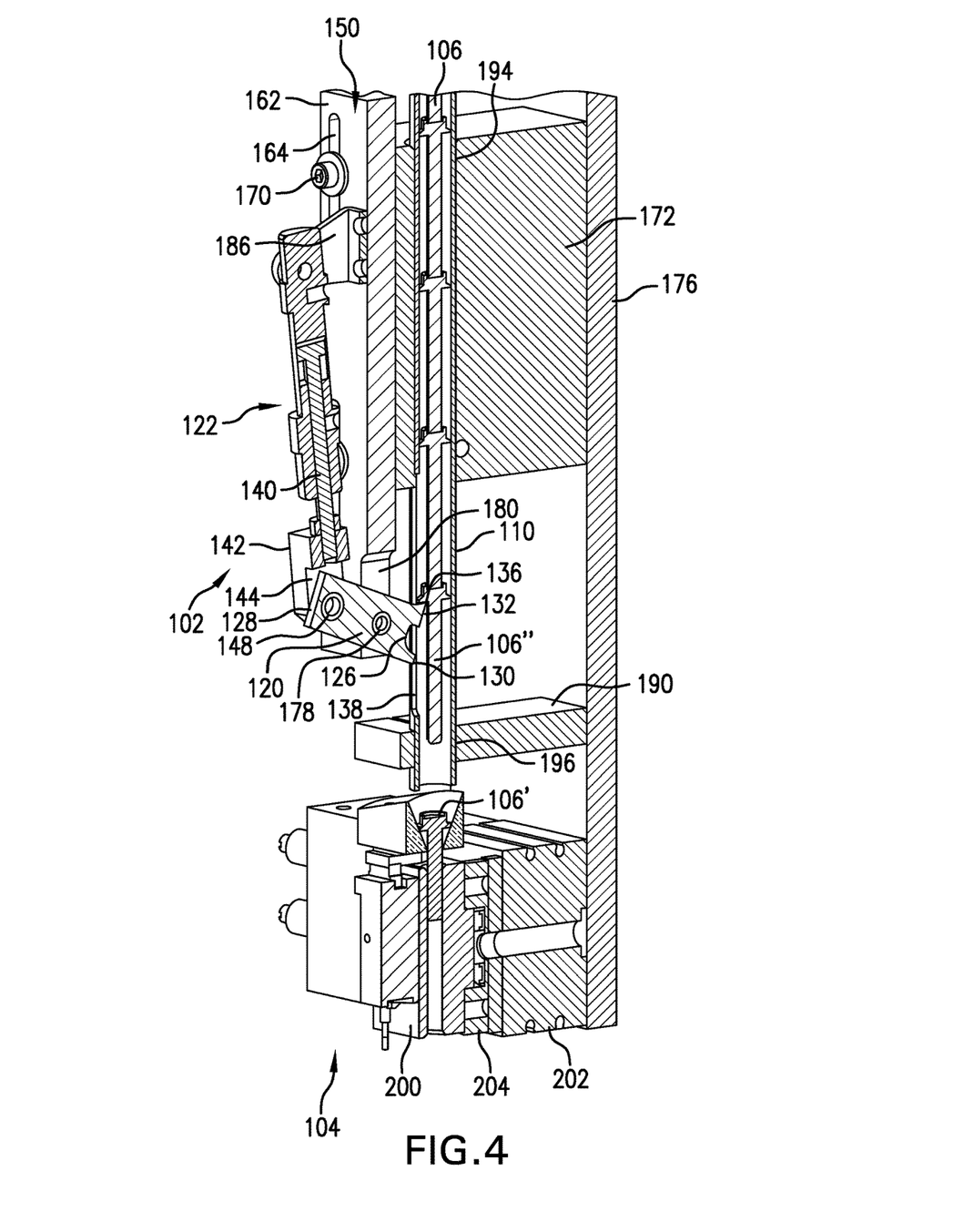
FIG. 4 is a cross-sectional view of both the escapement mechanism in the second position and the rotate and present apparatus in a fastener receiving position.

With particular reference to FIGS. 2-4, the escapement mechanism 102 includes a trigger 120 and an actuator 122 coupled to the trigger. The actuator 122 moves the escapement mechanism 102 between the first position and second position by pivoting the trigger 120. The trigger 120 is configured to selectively engage the fasteners 106 in the column and release the fasteners one at a time to the rotate and present apparatus 104. In the depicted aspect, the trigger 120 includes a first end 126 and an opposite second end 128. The first end 126 of the trigger 120 is provided with a first engaging portion 130 and a separate second engaging portion 132. The first portion 130 engages each fastener 106 in the first location in the column 110 and the second portion 132 engages each fastener upstream of the forward most or downstream fastener (i.e., first fastener 106') in the second location in the column 110. In the depicted embodiment, the first portion 130 is located beneath the second portion 132, each of the first portion 130 and the second portion 132 being generally rectangular shaped, with the second portion 132 being further provided with a generally triangular tip 136 which projects upwardly from the first end 126. Although, it should be appreciated that alternative configurations of the first and second portions 130, 132 are contemplated, the requirement being the selective engagement and cycling of the fasteners 106 at the first and second locations in the column 110.

FIG. 2 depicts the escapement mechanism 102 in the first position with the first portion 130 of the trigger 120 projecting through a slotted opening or cutout 138 in the column 110 and engaging the forward most or downstream fastener (i.e., first fastener 106') at the first location. In the first position, the second portion 132 of the trigger 120 is spaced from the column 110. FIGS. 3 and 4 depict the escapement mechanism 102 in the second position with the trigger 120 pivoted downwardly via the actuator 122. The first portion 130 of the trigger 120 is spaced from the column 110 and the second portion 132 of the trigger projects through the slotted cutout 138 and engages the immediately upstream second fastener 106" at the second location. As the trigger 120 is pivoted upwardly back toward the position depicted in FIG. 2 by the actuator 122, the second fastener 106" is first moved or cycled upwardly in the column 110 via engagement with the second portion 132 and is then released by the second portion 132 as the second portion 132 is moved out of the column 110. The second fastener 106" at least partially drops in the column 110 and is then engaged by the first portion 130 of the trigger 120 at the first location in the column 110 ready to be delivered to the rotate and present apparatus 104.

In the depicted aspect, the actuator 122, which can be a pneumatic piston, includes a drive member or drive rod 140 having secured at its distal end a coupling 142 which is pivotally mounted to the second end 128 of the trigger 120. According to one aspect, the coupling 142 includes a slot 144 dimensioned to receive the second end 128, and a pivot pin 148 mounts the coupling 142 to the second end 128 of the trigger 120. Further, according to the illustrated embodiment, the escapement mechanism 102 is mounted on a support 150 adjustable in a height direction relative to the rotate and present apparatus 104. This allows the escapement mechanism 102 to deliver fasteners of different lengths to the apparatus 104. As shown, the support 150, which can be a rectangular shaped plate, has a first end portion 162 with a first pair of elongated opening 164 and a second end portion 166 with a second pair of elongated openings 168. Fasteners 170 are received in the first and second openings 164, 168 and threadingly engage an alignment block 172, which itself is mounted to a support plate 176. In the depicted aspect, the trigger 120 is also pivotally mounted to the second end portion 166 of the support 150 via a second pivot pin 178. It should be appreciated that to properly align the trigger 120 with the cutout 138 in the column 110, the second end portion 166 of the support 150 can include a slot 180 dimensioned to receive the first end 126 of the trigger 120. A support bracket 186 mounts the actuator 122 to the alignment block 172. A second alignment block 190 located beneath the support 150 is mounted to the support plate 176. Each of the alignment block 172 and the second alignment block 190 includes a respective bore 194, 196 extending therethrough dimensioned to receive the column 110, thereby securing the column to the support plate 176.

Figure 5:
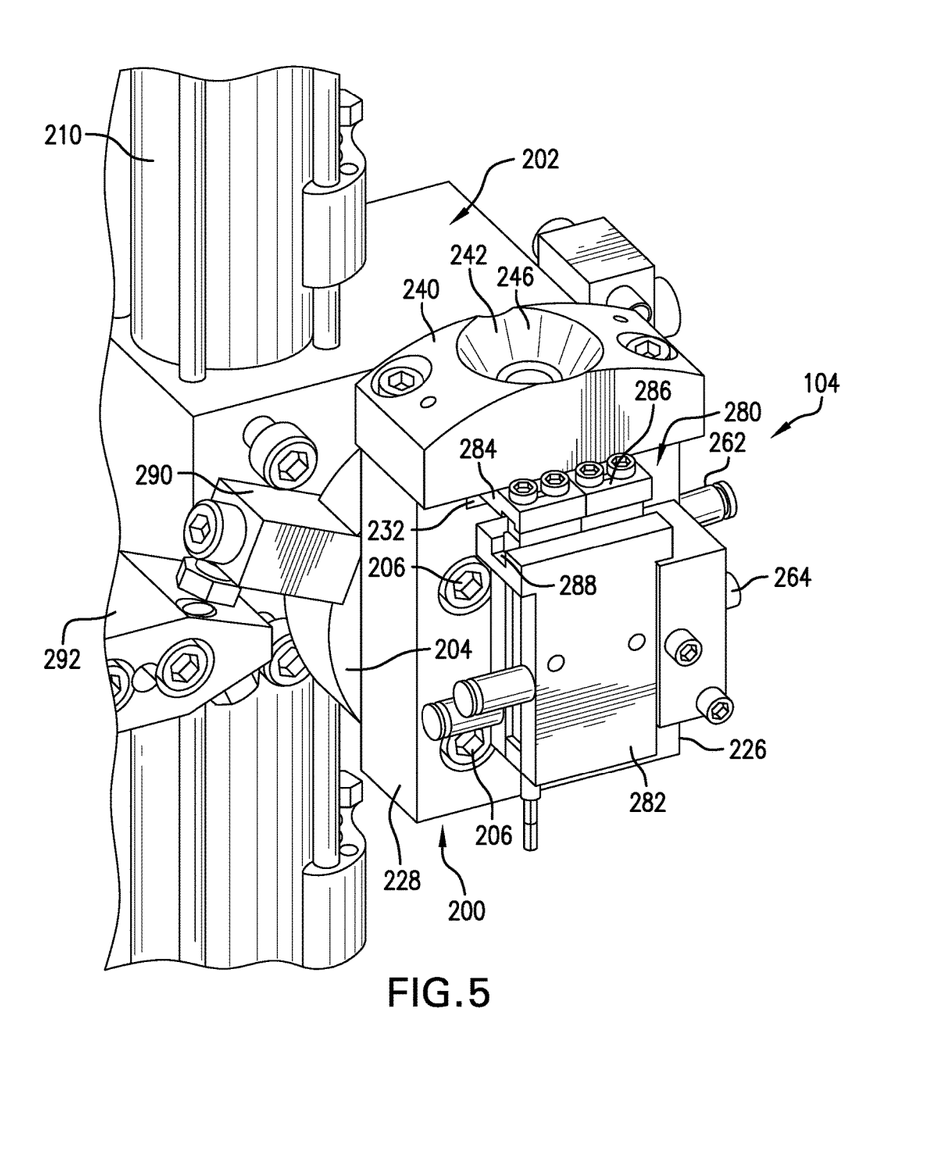
FIG. 5 is a perspective view of the rotate and present apparatus in the fastener receiving position.
Figure 6:
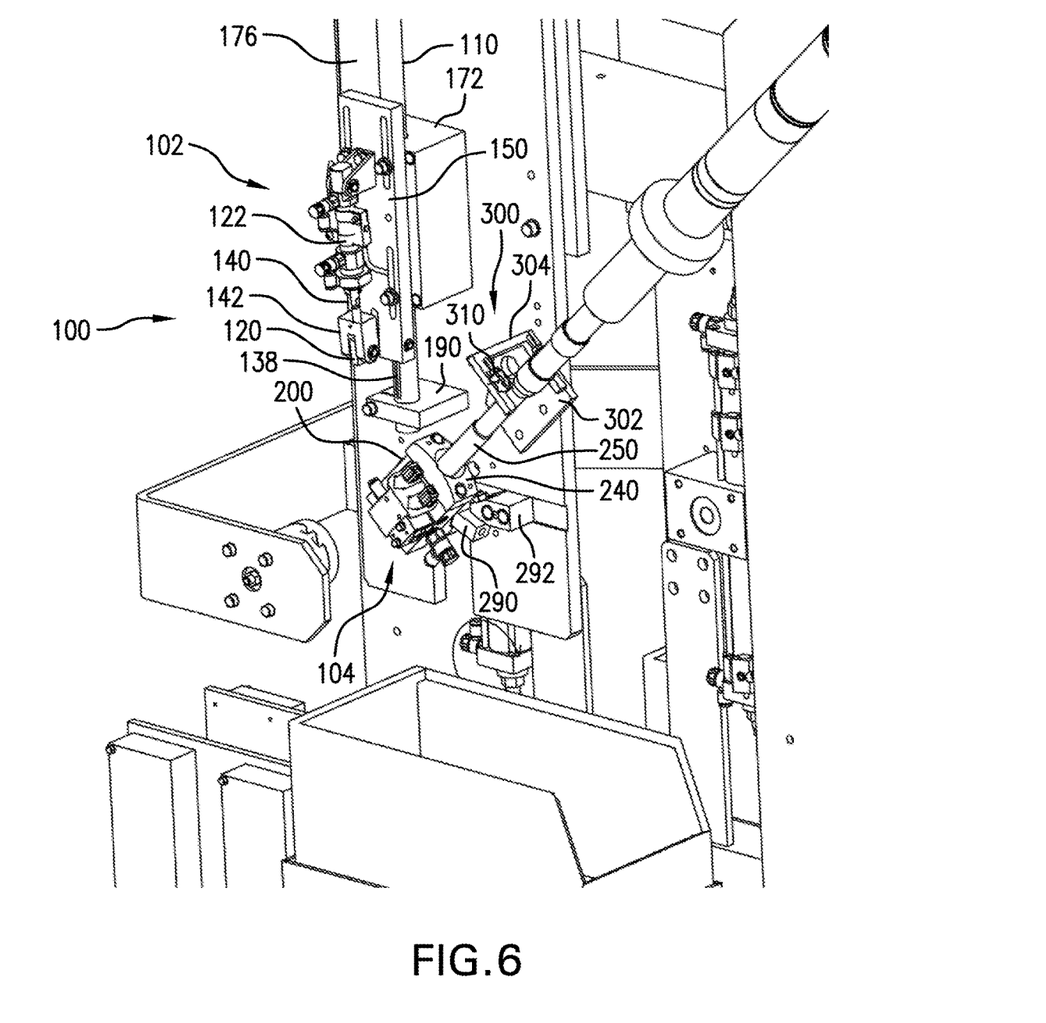
FIG. 6 is a perspective view of the rotate and present apparatus in a fastener loading position.
Figure 7:
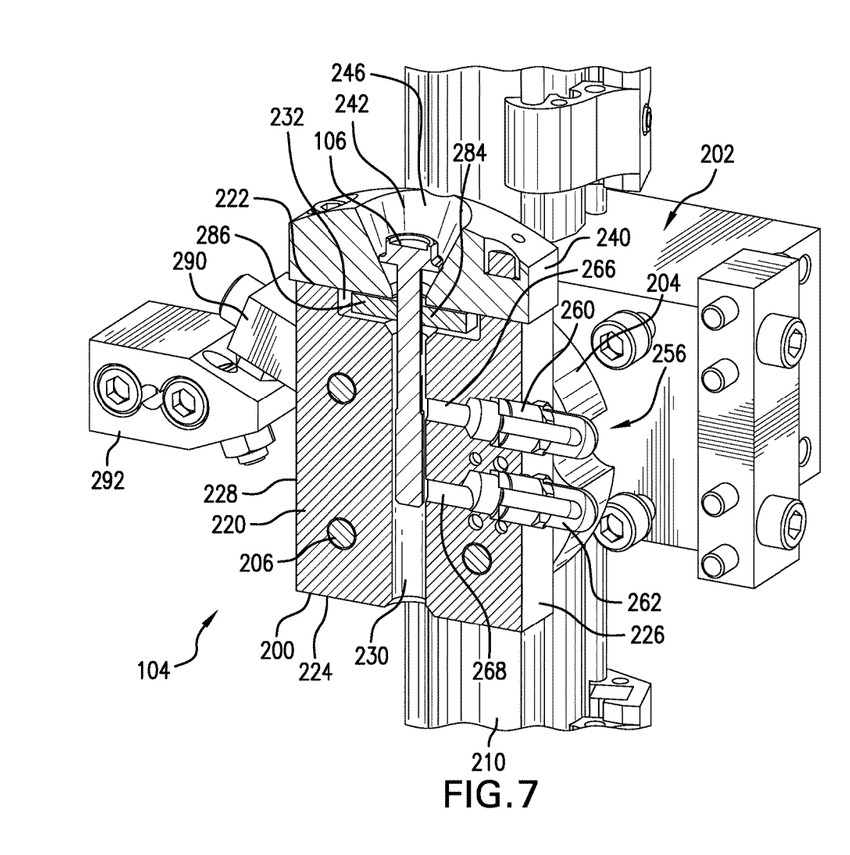
FIGS. 7 and 8 are cross-sectional views of a fastener holder of the rotate and present apparatus with differing sized fasteners properly seated therein.

With reference to FIGS. 5-7, the exemplary rotate and present apparatus 104 includes a fastener holder 200 adapted to receive each fastener 106 released from the escapement mechanism 102 in the fastener receiving position and move the fastener to one of the fastener loading position for pickup by the fastener installation device 112 or to the fastener reject position. To allow for this movement by the fastener holder 200, the apparatus 104 includes a rotary actuator 202 which has is rotary mount 204 connected to the fastener holder 200, for example, by fasteners 206. The rotary actuator 202 is adapted to rotate the fastener holder 200 in the first direction between the fastener receiving position (FIG. 4) and the fastener loading position (FIG. 1 or FIG. 6) and rotate the fastener holder 200 in the second opposite direction from the fastener loading position to the fastener reject position. The rotary actuator 202 can be mounted on a support post 210 which can be connected to the support plate 176. The support post 210 can allow for selective vertical positioning of the rotate and present apparatus 104 relative to the escapement mechanism 102. In the depicted embodiment, the fastener holder 200 includes a body 220 having an upper end 222, a lower end 224 and opposite sides 226, 228. A bore 230 extends through the body 220 from the upper end 222 to the lower end 224. The bore 230 is dimensioned to receive the each fastener 106 (e.g., the shank of each bolt). Further provided on the upper end 222 of the fastener holder 200 is a channel 232, which in the depicted aspect extends parallel to the sides 226, 228.

The exemplary rotate and present apparatus 104 further includes a cup member 240 secured to the upper end 222 of the fastener holder 200 and covering the channel 232. In the illustrated aspect, the cup member 240 has an opening 242 extending therethrough and axially aligned with the bore 230, the opening 242 adapted to receive each fastener 106 from the escapement mechanism 102. A surface 246 of the cup member 240 that defines the opening 242 is shaped to properly center/seat each fastener 106 in the fastener holder 200 for pickup by the fastener installation device 112. By way of example, the surface 246 is frustoconical shaped, which funnels each fastener 106 into the bore 230 of the fastener holder 200. Further, it should be appreciated that this shape of the surface 246 guides a socket member 250 of the fastener installation device 112 securely onto the fastener head. In addition, as depicted in FIG. 7, the surface 246 engages the fastener (e.g., a flange on the bolt head), thereby elevating the fastener 106 within the opening 242 so that when the socket member 250 is guided onto the fastener head via the surface 246 the socket member 250 is firmly fitted over the fastener head.

Figure 8:
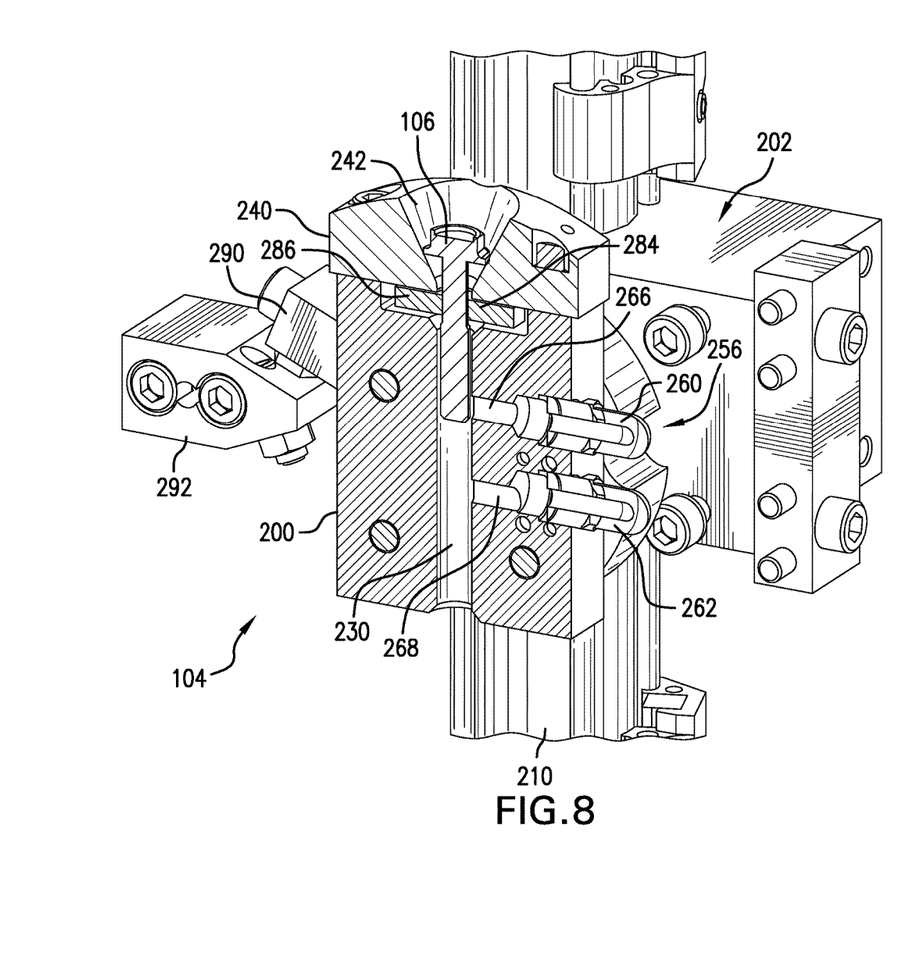
Figure 9:
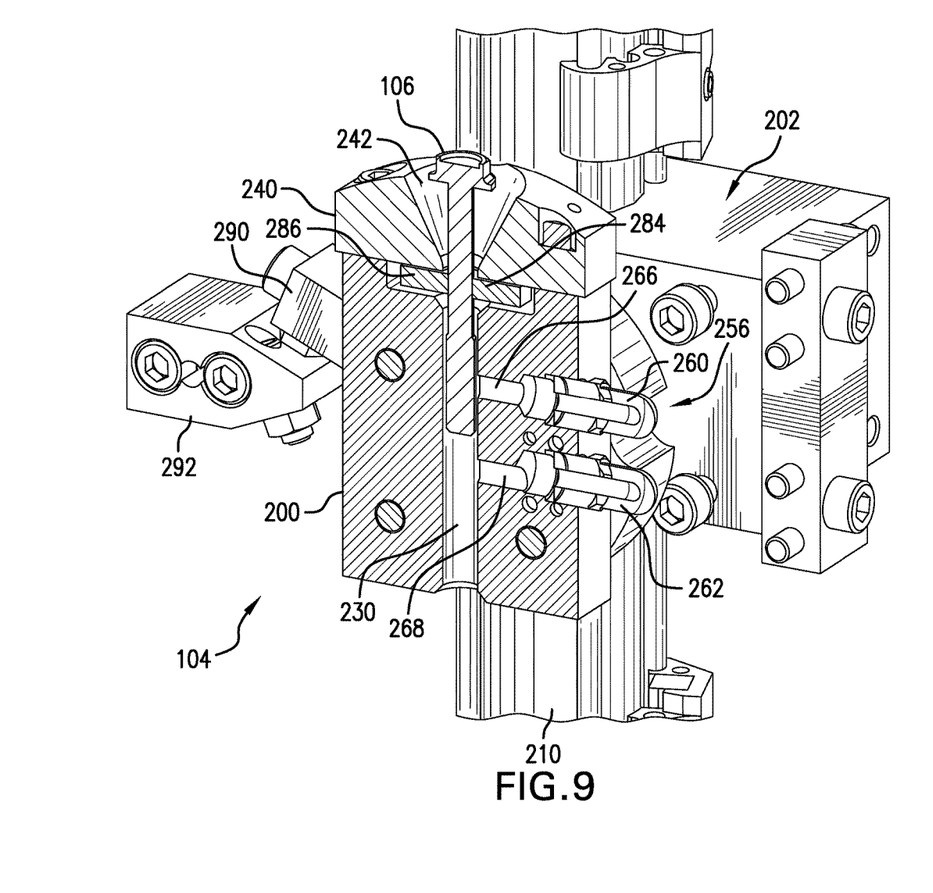
FIG. 9 is a cross-sectional view of the fastener holder with an improperly seated fastener.

To further ensure that each fastener 106 is properly seated in the fastener holder 200 in the fastener receiving position of the apparatus 104, a sensing device 256 is coupled to the fastener holder 200. With reference to FIGS. 7-9, according to one aspect the sensing device 256 is defined by first and second pneumatic fittings 260, 262 that are received in respective first and second ports 266, 268 located in the body 220. Each of the first and second ports 266, 268 is in fluid communication with the bore 230. The fittings 260, 262 are connected to a pressure regulator (not shown) which delivers low pressurized air to each of the fittings 260, 262 and monitors the air pressure within each of the ports. The depicted sensing device 256 allows for fasteners of differing lengths to be indexed by the exemplary fastener delivery system 100 by monitoring one or both of the air pressure in each of the first and second ports 266, 268. FIG. 7 shows, for example, a 50 mm bolt properly seated in the fastener holder 200. Because the shank of the bolt at least partially blocks each of the first and second ports 266, 268, the air pressure in each of the first and second ports 266, 268 increases, and this pressure increase sensed by the pressure regulator is indicative of the fastener fully resting in the fastener holder 200. FIG. 8 shows, for example, a 32 mm bolt properly seated in the fastener holder 200. With the shorter bolt, only the air pressure in the first port 266 is monitored by the pressure regulator. Because the shank of the bolt at least partially blocks the first port 266, the air pressure in the first port 266 increases, and, again, this pressure increase sensed by the pressure regulator is indicative of the shorter fastener fully resting in the fastener holder 200. FIG. 9 shows, for example, a 50 mm bolt not properly seated in the fastener holder 200. Because the shank of the bolt does not block the second port 268, the air pressure in the second port 268 remains the same, which is indicative to the pressure regulator that the fastener is not fully resting in the fastener holder 200. It should be appreciated that the depicted sensing device 256 is be way of example only, and that alternative manners for detecting presence of the fasteners 106 in the fastener holder 200 are contemplated. For example, electrical contact switches can be located in the bore 230 at locations similar to the first and second ports 266, 268. The contact switches can be actuated via the shank of the fastener.

With reference back to FIG. 5, a retaining device 280 is connected to the fastener holder 200 and adapted to retain each fastener 106 in the fastener holder as the fastener holder 200 is rotated from the fastener receiving position toward one of the fastener loading position and the fastener reject position. In the depicted embodiment, the retaining device includes a housing 282 for movably mounting a pair of spaced fingers 284, 286 in a channel 288 formed in the housing. The fastener holder 200 includes the channel 232 also sized to movably receive the fingers 284, 286. In the fastener loading position the retaining device 280 is adapted to move the fingers 284, 286 into engagement with the fastener 106 held in the fastener holder 200. This engagement retains the fastener 106 in the fastener holder 200, and the retaining device 280 is further adapted to move the fingers 284, 286 out of engagement with the fastener 106 in each of the fastener loading position and the fastener reject position.

According to the present embodiment, a first stop member 290 can be connected to the fastener holder 200, particularly one of the sides 226, 228 of the fastener holder body 220. A second stop member 292 spaced from the fastener holder 200 can be connected to the support plate 176. With this arrangement, a first engagement of the first stop member 290 with the second stop member 292 defines a first hard stop for the fastener holder 200 at the fastener receiving position (see FIGS. 5 and 6), and a second engagement of the first stop member 290 with the second stop member 292 defines a second hard stop for the fastener holder 200 at the fastener loading position (see FIGS. 1 and 6). Therefore, it should be appreciated that by having the first and second hard stops at the respective fastener receiving and loading positions a relatively inexpensive rotary actuator 202 can be used for the apparatus 104 because the hard stops eliminate a need for a sensor/rotary encoder to determine rotational position of the fastener holder 200.

Referring to FIG. 6, a sensing device 300 operably associated with the rotate and present apparatus 104 is adapted to detect engagement of the fastener installation device 112 with each fastener 106 in the fastener loading position. In the illustrated aspect, a support 302 having an L-shaped or C-shaped flange 304 extending outwardly therefrom is mounted to the support plate 176. The flange 304 is oriented on the support 302 so that the socket member 250 of the device 112 is moved between the support 302 and the flange 304 in the fastener receiving position of the apparatus 104. According to one embodiment, the sensing device 300 is a photoelectric sensor, or photo eye, 310 mounted to the flange 304 which detects the presence of the socket member 250, and the detected presence of the socket member 250 ensures engagement with the fastener 106 held in the fastener holder 200. If the sensor 310 does not properly detect the presence of the socket member 250, it can be assumed that the socket member 250 has not engaged the fastener 106 and the apparatus 104 is then rotated to the fastener reject position to discard the fastener 106 held in the fastener holder 200.

Figure 10:
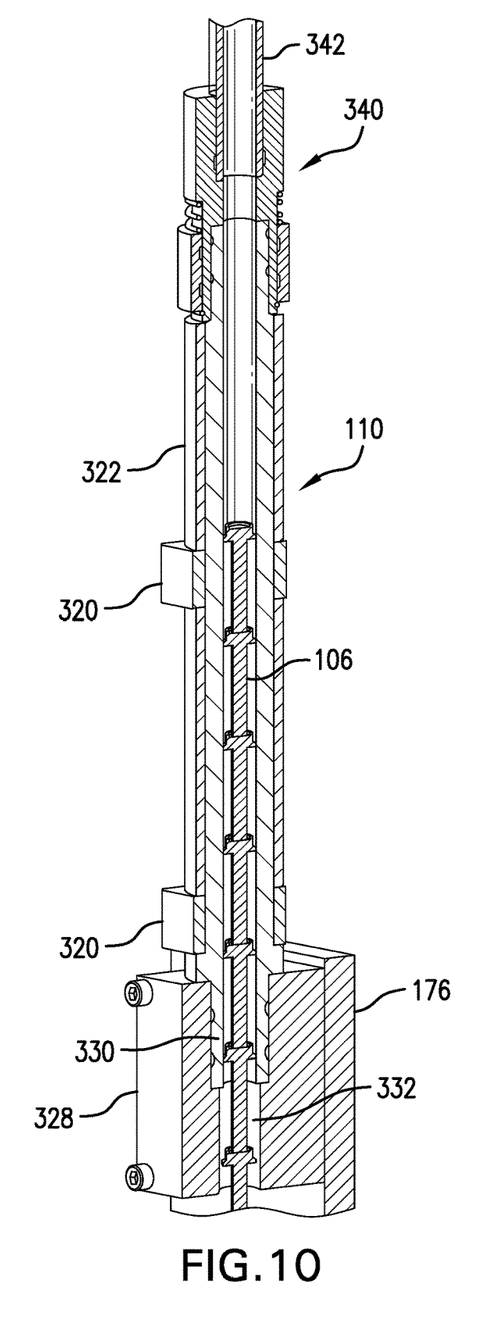
FIG. 10 is a cross-sectional view of the fastener column with a connector and a support member.

With reference to FIGS. 1 and 10, at least one sensing device 320 is mounted on the column 110 and adapted to detect the fasteners 106 in the column. To this end, the column 110 can include a first part 322 formed, for example, of a nylon material, and a second part 324 formed, for example, of a metal material. The at least one sensing device 320 is mounted to the first part 322. A third alignment block 328 mounted to the support plate 176 interconnects and aligns the first and second parts 322, 324 of the column 110. As depicted, an end portion 330 of the first part 322 has a reduced dimension and is fitted within a bore 332 extending through the third alignment block 328. The second part 324 is also fitted within the bore 332. This provides a smooth transition from the first part 322 to the second part 324 of the column 110. A quick release connector 340 can be mounted to the first part 322 for releasably connecting the first part 322 to a fastener delivery tube 342.

It will be appreciated that operation of the exemplary fastener delivery system 100 can be controlled by a computer which supplies control signals to appropriate electrically controlled valves connected in pneumatic lines leading to pressure/exhaust ports of the actuator 122 and pressure/exhaust ports of the retaining device 280, at appropriate times in the operating cycle. The computer has input lines for receiving signals from the sensing devices 256, 300, 320, and output lines to supply control signals to, for example, a main control of the fastener delivery system 100 for operating the escapement mechanism 102 and the rotate and present apparatus 104.

It will be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A fastener delivery system comprising:
an escapement mechanism configured to control dispensing of associated fasteners located in a column one associated fastener at a time; and
a rotate and present apparatus operable with the escapement mechanism, the rotate and present apparatus configured to rotate between a fastener receiving position and a fastener loading position, wherein in the fastener receiving position the rotate and present apparatus is adapted to receive each associated fastener released from the escapement mechanism, and in the fastener loading position the rotate and present apparatus is configured to present each associated fastener to an associated fastener installation device,
wherein the escapement mechanism is adjustable in a height direction relative to the rotate and present apparatus,
wherein the rotate and present apparatus includes a fastener holder adapted to receive each associated fastener, a rotary actuator connected to the fastener holder and adapted to rotate the fastener holder between the fastener receiving position and the fastener loading position, and a retaining device connected to the fastener holder and adapted to retain each associated fastener in the fastener holder as the fastener holder is rotated,
wherein the rotary actuator is adapted to rotate the fastener holder in a first direction from the fastener receiving position, past a fastener reject position, and to the fastener loading position,
wherein the rotary actuator is adapted to rotate the fastener holder in a second opposite direction from the fastener loading position to the fastener reject position.

2. The system of claim 1, wherein the escapement mechanism is configured to move between a first position and a second position, wherein in the first position the escapement mechanism is adapted to directly engage an associated first fastener at a first location in the column, wherein in the second position the escapement mechanism is adapted to release the associated first fastener and directly engage an associated second fastener immediately upstream of the associated first fastener at a second location in the column, and wherein the escapement mechanism is adapted to cycle the associated second fastener to the first location in the column as the escapement mechanism moves from the second position to the first position.

3. The system of claim 2, wherein the escapement mechanism includes a trigger having a first portion engaging each associated fastener in the first position in the column and a second portion engaging each associated fastener upstream of the first associated fastener in the second position in the column.

4. The system of claim 3, wherein in the first position the first portion is adapted to project into the column and the second portion is spaced from the column, and in the second position the trigger is pivoted downward, the first portion is spaced from the column and the second portion is adapted to project into the column.

5. The system of claim 3, wherein the escapement mechanism includes an actuator coupled to the trigger, the actuator moving the escapement mechanism between the first position and second position.

6. The system of claim 3, wherein the escapement mechanism is mounted on a support adjustable in a height direction relative to the rotate and present apparatus.

7. The system of claim 1, wherein the retaining device includes a pair of spaced fingers, and the fastener holder includes an elongated opening sized to receive the fingers, wherein in the fastener loading position the fingers are adapted to move into engagement with each associated fastener held in the fastener holder.

8. The system of claim 1, wherein the rotate and present apparatus further includes a cup member secured to the fastener holder, the cup member having a frustoconical shaped opening adapted to receive each associated fastener from the escapement mechanism and center each associated fastener in the fastener holder for the associated fastener installation device.

9. The system of claim 8, further including a sensing device coupled to the fastener holder, wherein in the fastener receiving position the sensing device is adapted to confirm proper receipt of each associated fastener in the cup member.

10. The system of claim 1, wherein the rotate and present apparatus includes a first stop member connected to the fastener holder and a second stop member spaced from the fastener holder, wherein
a first engagement of the first stop member with the second stop member defines a first hard stop for the fastener holder at the fastener receiving position, and a second engagement of the first stop member with the second stop member defines a second hard stop for the fastener holder at the fastener loading position.

11. The system of claim 1, further including a sensing device operably associated with the rotate and present apparatus and adapted to detect engagement of the associated fastener installation device with each associated fastener in the fastener loading position.

12. The system of claim 1, further including a sensing device mounted on the column and adapted to detect the associated fasteners in the column, wherein the column includes a first part formed of a nylon material, the sensing device mounted to the first part, and a second part formed of a metal material, and furthering including a separate support member interconnecting and aligning the first and second parts of the column.

13. A fastener delivery system comprising:
an escapement mechanism configured to control dispensing of associated fasteners located in a column one associated fastener at a time; and
a rotate and present rotate and present apparatus operable with the escapement mechanism and rotatable between a fastener receiving position and a fastener loading position, the rotate and present apparatus including a fastener holder adapted to receive each associated fastener released from the escapement mechanism and position each associated fastener for an associated fastener installation device, and a rotary actuator connected to the fastener holder and adapted to rotate the fastener holder between the fastener receiving position and the fastener loading position,
wherein the rotary actuator is adapted to rotate the fastener holder in a first direction from the fastener receiving position to the fastener loading position, and the rotary actuator is adapted to rotate the fastener holder in a second opposite direction from the fastener loading position to a fastener reject position,
wherein the rotate and present apparatus includes a first stop member connected to the fastener holder and a second stop member spaced from the fastener holder, wherein
a first engagement of the first stop member with the second stop member defines a first hard stop for the fastener holder at the fastener receiving position, and a second engagement of the first stop member with the second stop member defines a second hard stop for the fastener holder at the fastener loading position.

14. The system of claim 13, wherein the escapement mechanism includes a trigger configured to move between a first position and a second position, the trigger adapted to engage a first associated fastener in a first location in the column and engage each associated fastener upstream of the first associated fastener in both the first location and a second, wherein the trigger has a first portion for associated fastener engagement only in the first location in the column and a separate second portion for associated fastener engagement only in the second location in the column, and the trigger is adapted to cycle the associated fasteners to the first location in the column as the trigger moves from the second position back to the first position location in the column.

15. The system of claim 13, wherein the rotate and present apparatus further includes a cup member secured to the fastener holder, the cup member having a frustoconical shaped opening adapted to receive each associated fastener from the escapement mechanism and center each associated fastener in the fastener holder for the associated fastener installation device.

16. The system of claim 15, wherein the rotate and present apparatus includes retaining device connected to the fastener holder and adapted to retain each associated fastener in the fastener holder as the fastener holder is rotated.

17. The system of claim 13, wherein the escapement mechanism is adjustable in a height direction relative to the rotate and present apparatus.

* * * * *